United States Patent [19]

Hinners

[11] 4,134,703
[45] Jan. 16, 1979

[54] LOCKING STRUCTURE FOR EXTENSIBLE POLE

[76] Inventor: Earl S. Hinners, 3664 Robinwood Ter., Hopkins, Minn. 55434

[21] Appl. No.: 876,476

[22] Filed: Feb. 9, 1978

[51] Int. Cl.² ............................................. F16B 7/10
[52] U.S. Cl. .................................... 403/104; 403/374; 280/11.37 F; 248/188.5
[58] Field of Search ........................ 403/104, 374, 370; 248/412, 188.5; 85/67; 280/11.37 F

[56] References Cited

U.S. PATENT DOCUMENTS

| | | | |
|---|---|---|---|
| 1,461,767 | 7/1923 | Weyrauch | 85/67 X |
| 2,456,205 | 12/1948 | Magder | 280/11.37 F |
| 2,503,997 | 4/1950 | Miller | 248/188.5 |
| 2,508,039 | 5/1950 | Neuwirth | 248/188.5 |
| 2,533,733 | 12/1950 | Jensen | 403/104 |
| 2,542,967 | 2/1951 | Waechter | 248/188.5 |

FOREIGN PATENT DOCUMENTS 267177  6/1950  Switzerland ................. 280/11.37 F Primary Examiner—Andrew V. Kundrat
Attorney, Agent, or Firm—Leo Gregory

[57] ABSTRACT

This invention relates to a locking structure for a pair of extensible or telescopic poles in which one of the poles has an upstanding bolt secured therein, carried on the bolt are a pair of frusto conical members having their tapered portions in facing engagement and being moveable along of the bolt, disposed between said frusto conical members is a split ring having angled or beveled inner surfaces corresponding to the adjacent tapered faces of said frusto conical members and an expandible nut threaded onto said bolt having a body portion compressible to have a pressure fit within the other of the poles and a locking washer holding the same onto said bolt whereby the rotation of pole in which the expanding member is disposed will move said expanding member downwardly of said bolt causing the frusto conical members to move toward each other thereby expanding the split ring therebetween causing the split ring to move outwardly into locking engagement with the adjacent wall surface of the first mentioned pole.

1 Claim, 5 Drawing Figures

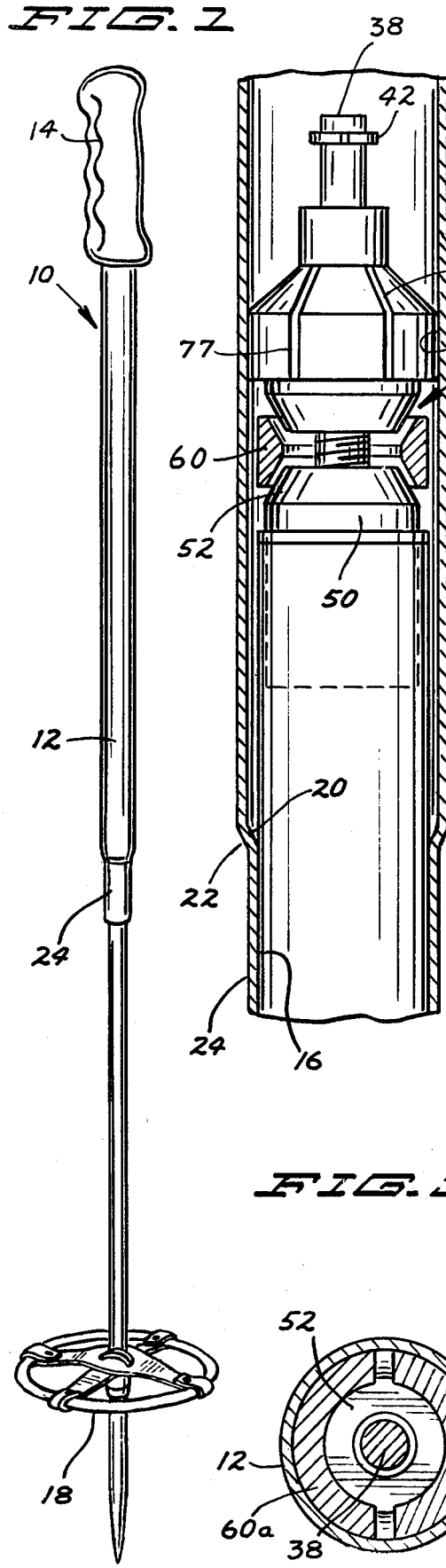
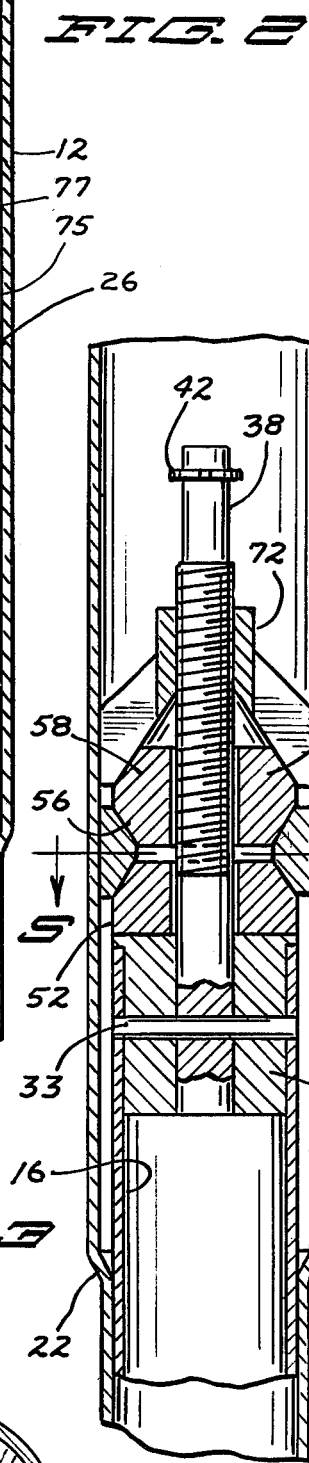
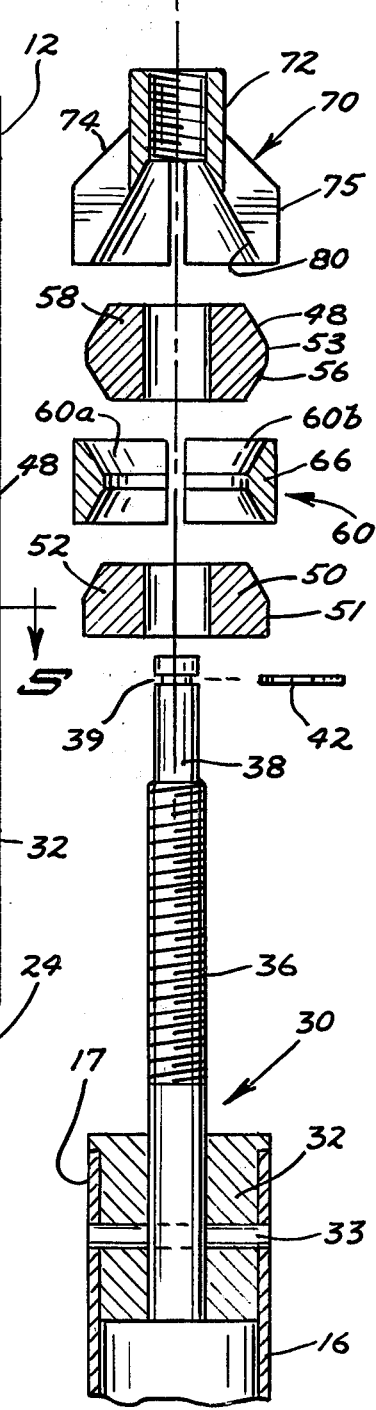
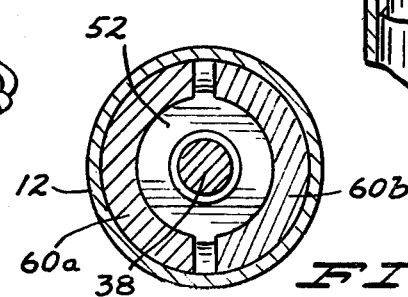

LOCKING STRUCTURE FOR EXTENSIBLE POLE

BACKGROUND OF THE INVENTION

1. Field of the Invention

This invention relates to a pair of extensible pole members embodying locking means operated by rotation of one of said poles.

2. Description of Prior Art

There are various means known in the prior art for causing the locking engagement of extensible poles. The closest prior art known is represented by the U.S. Pat. Nos. 2,456,205 issued to J. Magder and 2,533,733 issued to H. A. Jensen. The patent to Magder shows a split cylinder which forms a wedging member by having an internal cam surface through which a bolt is forced by rotation of one of the poles to expand the wedging member. Jensen shows a unitary wedging member with circumferential longitudinal slots thereabout and having an internal cam surface and rotation of one of the poles draws a bolt through the locking member into engagement with the cam surface therein to support the wedging member. The structure herein provides locking members which are unobviously different from what is known in the prior art.

SUMMARY OF THE INVENTION

The object of the invention herein is to provide a simply constructed locking means to be disposed within a pair of extensible or telescopic poles whereby rotation of one pole will operate said locking member and place said poles in locked engagement relative to one another.

More particularly it is an object of this invention to provide a locking structure for a pair of telescopic poles wherein a bolt is secured in one of the poles and carries thereon freely moveable thereon a pair of wedge members having facing inwardly tapered surfaces and a split ring having a projected angular inner surface mating with the tapered facing surfaces of said wedge members and an operating member formed as a nut having a skirt like body portion having a plurality of circumferential spaced slots therein and a lock washer carried on the outer end of said bolt to secure said operating member, said operating member upon rotation causing said wedge members to expand said split ring to lockingly engage the other of said poles.

These and other objects and advantages of the invention will be set forth in the following description made in connection with the accompanying drawings in which like reference characters refer to similar parts throughout the several views.

BRIEF DESCRIPTION OF THE DRAWINGS

FIG. 1 is a view in elevation of a ski pole;

FIG. 2 is a view in vertical section of a lock structure in enlarged section and shown in one position;

FIG. 3 is a view similar to FIG. 2 showing the lock structure in another operating position;

FIG. 4 is an exploded view of the locking structure shown in vertical section; and FIG. 5 is a view in horizontal section taken on line 5-5 of FIG. 3 as indicated.

DESCRIPTION OF A PREFERRED EMBODIMENT

Referring to the drawings, for the purpose of illustration only for a disclosure of the locking structure herein to be described and not for purpose of limitation, a tubular ski pole 10 is shown consisting of an upper pole portion 12 carrying a handle 14 and a lower pole portion 16 slidable within said upper portion and carrying adjacent its lower end portion a conventional snow ring 18.

Said lower pole portion has integral therewith an annular rib or shoulder 20 which engages the shoulder 22 of a lower terminal portion 24 of reduced diameter of said upper pole portion. Thus said pole portions are prevented from being pulled apart.

Referring to FIG. 4, a description will be given of the locking structure 26 which consists of a bolt 30 having a head portion 32 secured in the lower pole portion 16 adjacent to its upper end 17 as by a transverse rivet 33. Said head portion is shown to be flush with the adjacent end of said pole.

Extending upwardly of said lower pole portion 16 is the threaded shank 36 of said bolt having an unthreaded upper terminal portion 38 which has adjacent its free end an annual groove 39 into which is disposed a lock washer 42.

Slidably disposed upon said bolt 30 to move freely thereon are a pair of wedge members 48 and 50. The member 50 has a cylindrical base portion 51 which rests upon the head 32 of said bolt 30, the same having a tapered upper portion 52 in the form of a frustrum. In opposed relation to said member 50 is the member 48 which has a cylindrical medial portion 53 having a downwardly tapered portion 56 and an upward tapered portion 58. The tapered portions 52 and 56 are mirror images of one another being disposed in opposed relation and having disposed therebetween a wedging ring 60 having an annular internal or bore portion 66 to mate with the adjacent tapered portions 52 and 56. Said ring is split to form two half circular portions 60a and 60b.

Carried at the upper end of said bolt is an operating member 70 having a threaded boss 72 and an annular skirt portion 74 extending around and depending from said boss having side wall portions 75 engaging the inner surface of said pole portion 12. Said skirt portion has a plurality of longitudinal slits 77 circumferentially spaced thereabout whereby said skirt portion is compressible to be held within said upper pole portion 12 by a pressure fit.

Said member 70 has a tapered counter-bore 80 adapted to receive therein the upper tapered portion 58 of said member 50.

The lock washer 42 retains said member 70 in its positions on said bolt 30.

It will be noted that the head 32 of said bolt 30 is secured to the lower pole portion 16. The operating member 70 has a frictional or pressure fit engagement with the inner surface of said upper pole portion 12 and rotates with the said upper pole portion.

In rotating in one direction, said operating member 70 will move downwardly of said bolt 30 having partially therein the upper tapered portion 58 of said wedge member 48 and in moving said wedge member downwardly toward the stationary wedge member 50, the split ring portion 60a and 60b therebetween are forced apart and are urged against the inner surface of said upper pole portion 12 for a locking engagement therewith.

To release said locking ring portion 60a and 60b the upper pole portion 12 is reversely rotated to move the locking member 70 upwardly of said bolt 30 and the pole portions 12 and 14 are then readily extended or telescoped as may be desired.

It will of course be understood that various changes may be made in form, details, arrangement and proportions of the parts without departing from the scope of the invention herein which, generally stated, consists in an apparatus capable of carrying out the objects above set forth, in the parts and combinations of parts disclosed and defined in the appended claims.

What is claimed is:

1. A locking structure for a pair of extensible or telescopic tubular members, having in combination
    a first and inner tubular member slidable within a second and outer tubular member,
    a threaded member having a head portion integral with and upstanding from the end portion of said first tubular member disposed within said second tubular member,
    a wedge member freely slidable on said threaded member and being disposed thereon abutting said head portion,
    a second wedge member freely slidable on said threaded member in superposed relation to said first wedge member,
    said wedge members having facing tapered portions as mirror images of one another,
    an operating member disposed on said threaded member in superposed relation to said second wedge member,
    a hub portion of said operating member being threaded onto said threaded member,
    a slotted skirt portion depending from said hub portion yielding circumferentially for a pressure fit within said second tubular member,
    said skirt portion having a tapered bore therein,
    said second wedge member having an upward extending portion tapered to mate with and be disposed in said tapered bore of said skirt portion,
    a split ring disposed on said threaded member between said wedge members,
    said split ring having inner facing portions corresponding with the adjacent tapered portions of said wedge members,
    whereby when said operating member is rotated downwardly of said threaded member, said wedge members separate said split ring portions radially and urge the same into locking engagement with the adjacent surface wall portion of said second tubular member, said operating member being rotated by rotation of said second tubular member.

* * * * *